United States Patent [19]

Hrusch

[11] Patent Number: 4,595,159
[45] Date of Patent: * Jun. 17, 1986

[54] LANDING GEAR MECHANISM INCLUDING RUNWAY-ROUGHNESS RESTRICTOR ASSEMBLY

[75] Inventor: Louis C. Hrusch, Chesterland, Ohio
[73] Assignee: Pneumo Corporation, Boston, Mass.
[ * ] Notice: The portion of the term of this patent subsequent to Nov. 12, 2002 has been disclaimed.
[21] Appl. No.: 670,978
[22] Filed: Nov. 13, 1984
[51] Int. Cl.⁴ .................................................. B64C 25/60
[52] U.S. Cl. .................................... 244/104 FP; 188/282; 188/284; 188/318
[58] Field of Search .................. 244/104 FP; 188/282, 188/284, 289, 315, 317, 318, 319

[56] References Cited
U.S. PATENT DOCUMENTS

| | | | |
|---|---|---|---|
| 3,215,283 | 11/1965 | Shaver | 188/289 |
| 3,605,960 | 9/1971 | Singer | 188/318 |
| 3,991,863 | 11/1976 | Lee | 188/318 |
| 4,273,303 | 6/1981 | Somm | 244/104 FP |
| 4,524,929 | 6/1985 | Gebhard | 244/104 FP |
| 4,552,324 | 11/1985 | Hrusch | 244/104 FP |

Primary Examiner—Galen Barefoot
Assistant Examiner—Lynn M. Fiorito
Attorney, Agent, or Firm—Renner, Otto, Boisselle & Lyon

[57] ABSTRACT

Landing gear mechanism includes a restrictor assembly containing a primary orifice for controlling the rate of instroke of the gear during landing and a taxi instroke bypass valve which provides for increased flow of hydraulic fluid within the gear whenever the gear engages a bump during taxiing to reduce the damping loads that would otherwise occur if all of the hydraulic fluid were required to flow through the primary orifice. The taxi instroke bypass valve assembly includes a bypass passage around the primary orifice, and a slide member which is axially movable relative to the orifice restrictor assembly for opening and closing the bypass passage.

28 Claims, 7 Drawing Figures

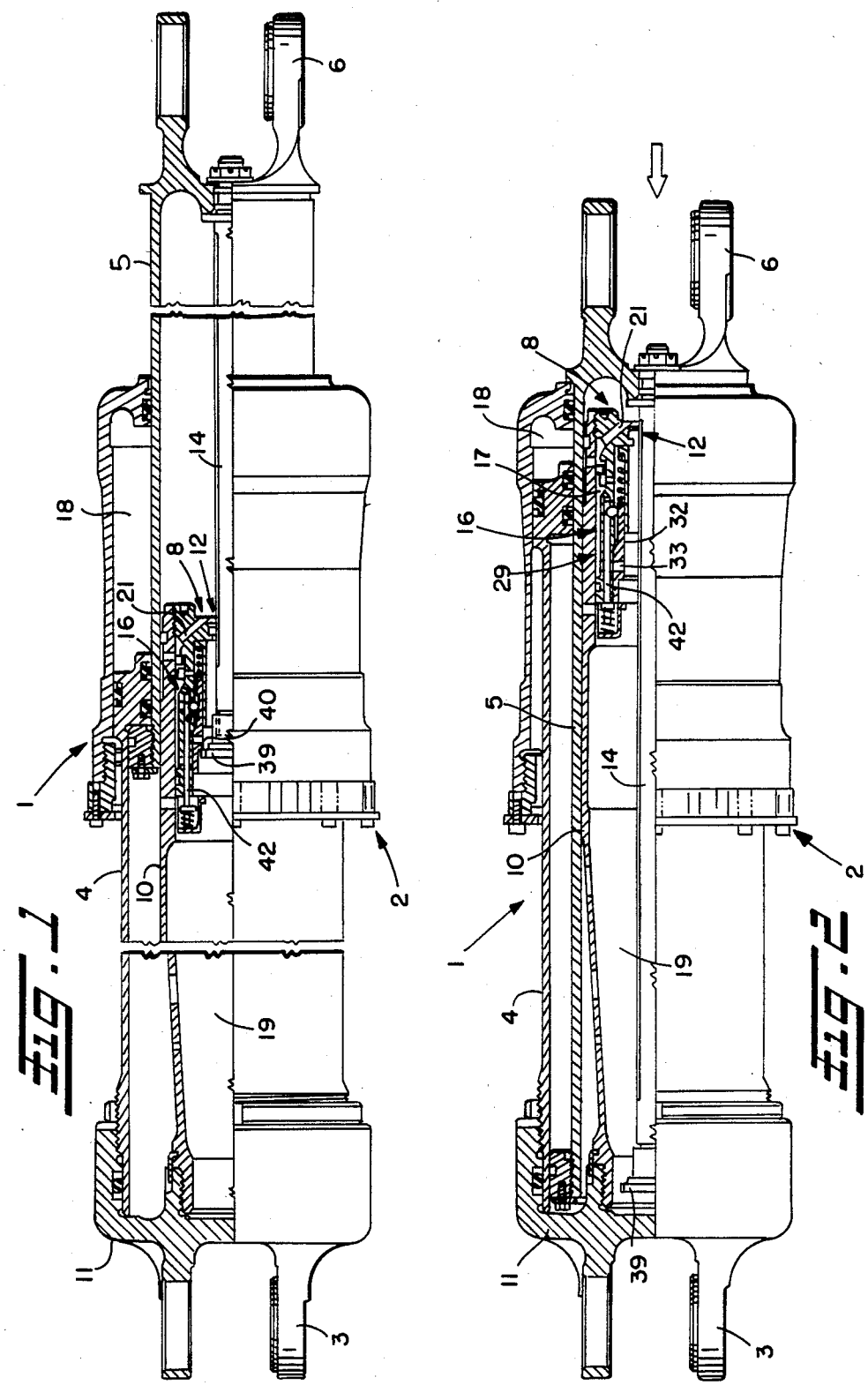

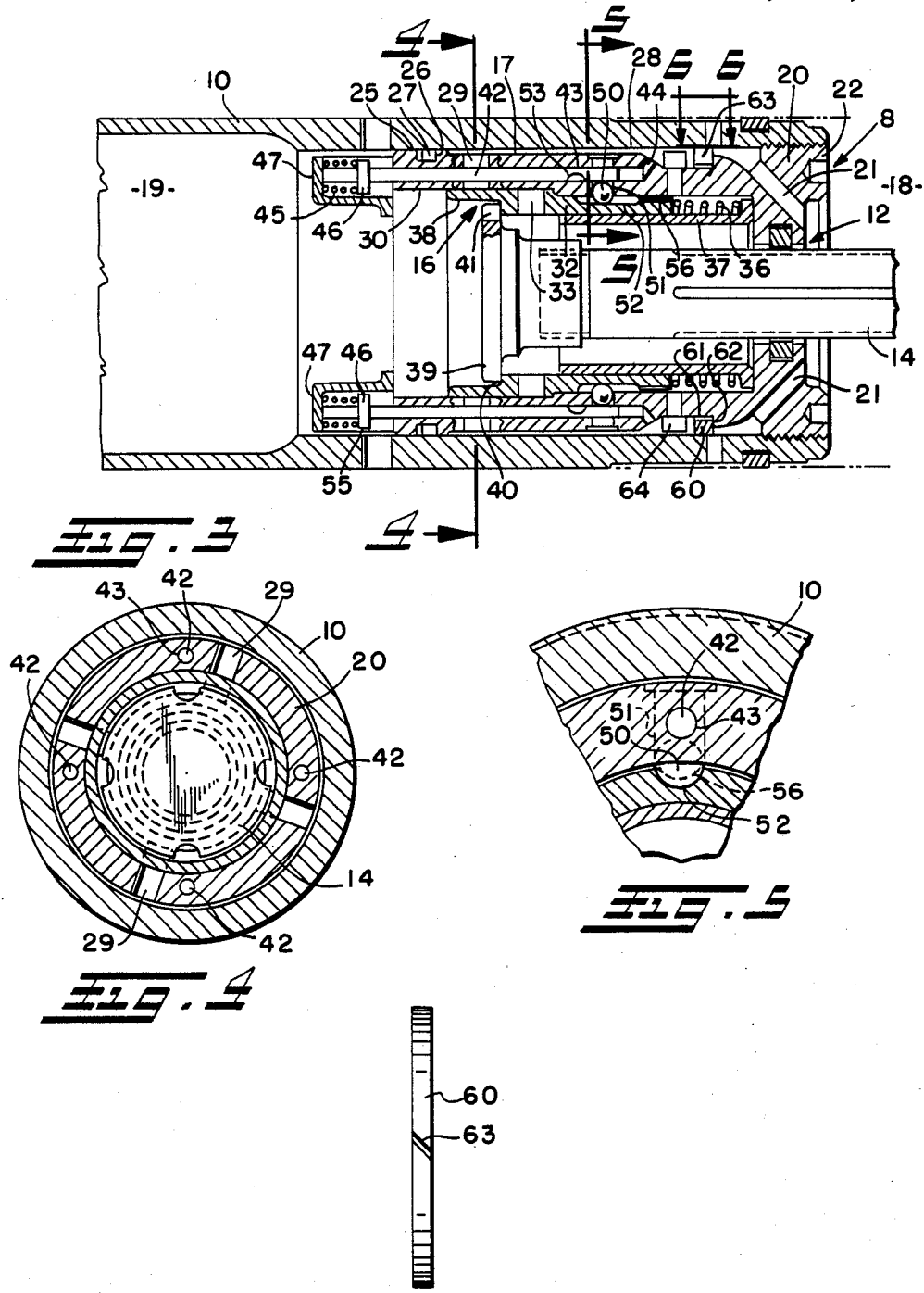

LANDING GEAR MECHANISM INCLUDING RUNWAY-ROUGHNESS RESTRICTOR ASSEMBLY

BACKGROUND OF THE INVENTION

This invention relates generally, as indicated, to a landing gear mechanism and more particularly to a restrictor assembly for substantially reducing or eliminating high damping loads as the landing gear negotiates bumps to permit high performance aircraft to operate on relatively rough runways.

Typically, landing gears for high performance aircraft such as operated by the military are not designed to operate on rough runways made rough, for example, as a result of temporary repairs to bomb damaged areas and the like.

It is possible to make the gear effective at heavy take-off weight and still provide the required shock strut stroke during landing to absorb the required amount of landing energy to prevent damage to the gear during landing on rough runways by providing the gear with different low spring rate load ranges as described in applicant's copending U.S. patent application Ser. No. 499,217, filed May 31, 1983, now U.S. Pat. No. 4,552,324, dated Nov. 12, 1985, the disclosure of which is incorporated herein by reference.

The landing gear of such copending application can also be made to discriminate between shock strut extension during normal ground roll and extension as the strut tire follows a sudden recess during forward travel, prevent cavitation in the lower piston chamber of the gear as the gear extends, and provide for piston rebound damping as the piston approaches the end of its stroke during full extension.

In addition, provision can be made in the gear of such copending application for substantially reducing or eliminating high damping loads as the landing gear negotiates bumps. Briefly, this is accomplished by the opening of a taxi instroke bypass valve as soon as the landing energy stroke is complete to allow fluid to pass more freely from the lower piston chamber to the upper piston chamber, bypassing the primary flow orifice.

The landing gear of the present invention may also include the various features disclosed in such copending application. However, the present landing gear includes a simpler mechanism for reducing or substantially eliminating the high damping loads that might otherwise take place as the gear negotiates bumps. Also, such mechanism is better suited to being packaged into a smaller space than the corresponding mechanism of such copending application.

SUMMARY OF THE INVENTION

With the foregoing in mind, it is a principal object of this invention to provide a landing gear generally of the type described but which includes a simplified mechanism for substantially reducing or eliminating high damping loads as the gear negotiates bumps during taxiing.

Another object is to provide such a landing gear in which the mechanism for reducing or substantially eliminating high damping loads can be more readily packaged into a smaller space within the envelope of a standard landing gear.

A further object is to incorporate the damping reduction mechanism of the present invention within a restrictor assembly which also controls the rate of instroke of the gear during landing of the aircraft.

Still another object is to provide such a landing gear in which the restrictor assembly also includes restrictor means for restricting the return flow through a bypass passage surrounding the primary orifice during the outstroke movement of the gear, but not during taxiing after landing has taken place.

These and other objects of the present invention may be accomplished by incorporating into the restrictor assembly of the landing gear a bypass valve assembly including a bypass passage around the primary orifice in the restrictor assembly and a slide member which is axially movable relative to the restrictor assembly for opening and closing the bypass passage. The slide member is held in the closed position whenever the landing gear is fully extended. Moreover, the slide member is maintained in the closed position during landing by the high pressure differential that is generated in the lower piston chamber during landing. However, as soon as the landing energy stroke is complete, the slide member is permitted to move to the open position allowing fluid to bypass the primary orifice, thereby greatly reducing or eliminating high damping loads that might otherwise take place as the gear negotiates bumps during taxiing.

Also in accordance with the invention, a restrictor may be provided in the bypass passage for restricting the return flow therethrough during the outstroke movement of the gear, but not during the instroke movement thereof. Preferably, such restrictor comprises a split ring disposed in an annular groove surrounding the restrictor assembly. The groove has an annular shoulder at the outboard end thereof which is engaged by the split ring during the outstroke movement of the gear to limit the flow through a narrow slot in the split ring during such outstroke movement. A stop pin permits limited movement of the split ring away from the shoulder during the instroke movement of the gear so as not to obstruct the flow through the bypass passage during such instroke movement.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary longitudinal section through one type of landing gear including a preferred form of restrictor assembly in accordance with this invention which permits operation on rough runways, such landing gear being shown fully extended;

FIG. 2 is a fragmentary longitudinal section similar to FIG. 1 but showing the landing gear fully compressed;

FIG. 3 is an enlarged longitudinal section of the restrictor assembly portion of the landing gear of FIG. 1 including a taxi instroke bypass valve assembly which is shown in its closed position prior to landing;

FIG. 4 is a transverse section through the restrictor assembly of FIG. 3, taken substantially along the plane of the line 4—4 thereof;

FIG. 5 is an enlarged fragmentary transverse section through the restrictor assembly of FIG. 3 taken substantially along the plane of the line 5—5 thereof;

FIG. 6 is a top plan view of a split ring which is included as part of the restrictor assembly, as seen from the plane of the line 6—6 of FIG. 4.

DETAILED DESCRIPTION OF THE PREFERRED EMBODIMENT

Figure 7:
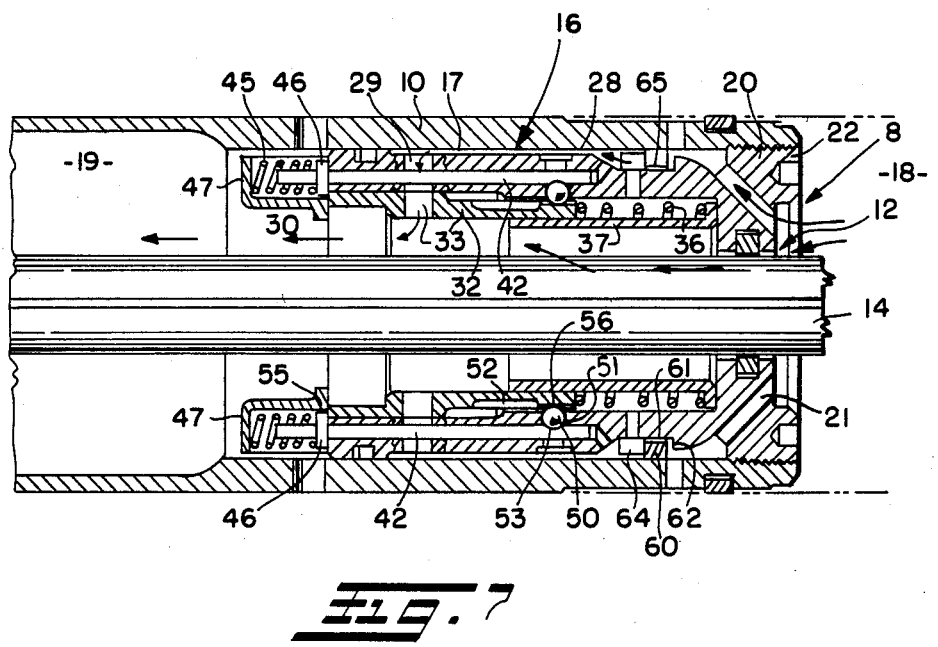
FIG. 7 is an enlarged longitudinal section of the restrictor assembly portion of the landing gear of FIG. 2 in which the taxi instroke bypass valve is shown in its open position during taxiing.

Referring now in detail to the drawings and initially to FIGS. 1 and 2 thereof, there is shown one form of landing gear mechanism 1 in accordance with this invention which generally consists of a main shock strut 2 including an outer main cylinder 4 having a trunnion 3 at its upper or inboard end for connection to the aircraft fuselage in conventional manner. Suitable support struts and drag brace members, not shown, may be provided for supporting the landing gear in its down position in order to support the aircraft while on the ground and during take-off and landing and for retracting the gear during flight.

Axially movable within the outer main cylinder 4 is a main strut piston 5 which extends downwardly and outwardly therefrom and has a suitable trunnion mount 6 at the outboard end thereof for mounting of a wheel and tire assembly thereon. The main strut piston 5 is generally tubular over its retracted length, to provide for relative sliding movement of a restrictor assembly 8 therein. The restrictor assembly 8 is mounted within the outboard end of an orifice support tube 10 which is in turn connected at its inboard end to the head end 11 of the outer main cylinder and extends into the main piston 5 over a substantial portion of the length of the main cylinder.

As shown in greater detail in FIGS. 3 and 7, the restrictor assembly 8 has a primary orifice 12 extending through the center thereof to provide for restricted flow therethrough during the compression stroke of the gear upon landing of the aircraft. Such orifice may, if desired, be a fixed orifice. However, preferably a metering pin 14 connected to the main piston 5 for movement therewith (see FIGS. 1 and 2) extends through the restrictor assembly 8 as shown. The metering pin may be provided with longitudinal slots which form the orifice 12. The use of such a metering pin permits the dynamic load stroke curve of the landing gear to be controlled within certain limits at different strut-stroke positions by controlling the taper of the metering pin in relation to the size of the orifice, as well known in the art.

Included within the restrictor assembly 8 of the present invention is a taxi instroke bypass valve 16 which opens one or more bypass passages 17 around the orifice 12 as soon as pressure equilibrium is obtained within the gear after landing to allow fluid to pass more freely from the lower piston chamber 18 to the upper piston chamber 19, bypassing the orifice 12, to greatly reduce or eliminate high damping loads that might otherwise take place as the gear negotiates bumps. Such high damping loads, if permitted to develop, could cause structural damage and possible collapse of the gear.

As best shown in FIGS. 3 and 7, the taxi instroke bypass valve 16 desirably includes a restrictor member 20 having a plurality of bypass orifices 21 (two such bypass orifices being shown) extending through a radial flange 22 at the outer end of the restrictor member radially outwardly of the primary orifice 12 which extends through the center of the restrictor member.

The radial flange 22 may be externally threaded for threaded attachment to the outer end of the orifice support tube 10. At the opposite or inner end of the restrictor member 20 is a land or shoulder 25 containing an external groove 26 for receipt of an O-ring seal 27 to provide sealed engagement with the inner wall of the orifice support tube. Intermediate the ends of the restrictor member 20 is an annular space or flow passage 28 between the exterior of the restrictor member and the interior of the orifice support tube which is communicated with at one end by the bypass orifices 21 in the outer end of the restrictor member 20. The fluid entering the space 28 through the bypass orifices is permitted to bypass the primary orifice 12 through radial holes or bypass openings 29 in the inboard end of the restrictor member whenever such radial holes are not blocked as described hereafter.

Axially movable within a stepped counterbore 30 in the restrictor member 20 is a slide member 32 through which the metering pin 14 also extends, with suitable clearance between the slide member and metering pin so as not to interfere with the flow of fluid through the primary orifice 12. The slide member has a plurality of radial holes 33 therethrough corresponding in number and circumferentially spaced in the same manner as the holes 29 in the restrictor member. During taxiing, when the gear is compressed as shown in FIG. 2, the slide member is fully extended as shown in FIGS. 2 and 7 with the holes 29, 33 in radial alignment with each other, whereby additional fluid is free to flow from the lower chamber 18 through the bypass passage 17 and around the primary orifice 12 to the upper chamber 19 for sudden compression of the gear to reduce the restriction instroke while taxiing on rough runways, for faster instroke of the gear if necessary.

The slide member 32 is biased outwardly to its fully extended position shown in FIGS. 2 and 7 by a spring 36 interposed between the inner end of the slide member and bottom of the counterbore in the restrictor member and retained in place as by a spring retainer 37.

On the other hand, when the gear is fully extended as shown in FIG. 1, the slide member is moved axially inwardly to the position shown in FIGS. 1 and 3, whereby the radial holes 29, 33 are no longer in radial alignment with each other, and a cylindrical portion 38 of the slide member overlies the holes 29 in the restrictor member thereby closing the bypass passage 17 around the primary orifice 12.

The initial inward movement of the slide member 32 from the FIG. 7 position to the FIG. 3 position may be triggered by engagement of a ramp or shoulder 39 on the inboard end of the metering pin 14 with a shoulder 40 on the slide member as the gear 1 approaches its fully extended position during take-off (see FIGS. 1 and 3). As long as the gear is substantially fully extended, the bypass passage 17 will remain closed because of the retention of the slide member in the closed position by the metering pin. Accordingly, upon initial ground contact of the gear during landing, all of the hydraulic fluid must pass from the lower piston chamber 18 to the upper chamber 19 through the primary orifice 12, giving full orifice landing dynamics to the gear during landing. Slots 41 (FIG. 3) may be provided in the shoulder 39 on the metering pin for unobstructed passage of hydraulic fluid past the shoulder when the shoulder is in engagement with the slide member.

When the wheel and tire assembly of the landing gear first comes into contact with the ground, there will be a normal build-up of pressure in the chamber 18 below the primary orifice 12. Since the bypass 17 is closed at this time due to the metering pin 14 position, the build-up pressure in chamber 18 will act on the inner ends of a plurality of shafts 42 contained in axial bores 43 in the restrictor member. The bores 43 extend into the restrictor member 20 from the inboard end thereof and are displaced circumferentially from the radial holes 29 therein (see FIG. 4). The inner ends of the axial bores 43 in turn communicate with the clearance space 28 surrounding the restrictor member 20 through radial passages 44 therein so that the pressure within the clearance space (which is the same as the pressure in the lower chamber 18) acts on the inner ends of the shafts. This forces the shafts outward, compressing associated springs 45 acting on flange portions 46 on the outer ends of the shafts tending to move the shafts axially inward. Spring retainer members 47 may be suitably secured to the inboard end of the restrictor member for retaining the springs 45 on the outer end portions of the shafts which extend outwardly beyond the restrictor member.

When the shafts 42 are in their outermost positions shown in FIG. 3, the inner ends of the shafts overlie respective balls or rollers 50 contained in radial openings 51 in the inner wall of the restrictor member thus forcing such balls or rollers radially inwardly into aligned external longitudinal grooves 52 in the slide member. The length and position of the grooves 52 are such that as long as the balls or rollers are maintained in engagement therewith by the shafts holding them inward, the bypass 17 will remain closed even after the metering pin moves out of engagement with the slide member during compression of the landing gear mechanism after landing. Not until sufficient hydraulic fluid passes through the primary orifice 12, such as at the end of the landing stroke, to relieve the differential pressure between the chambers 18, 19 and thus the differential pressure acting on the inner ends of the shafts 42 will the slide member be permitted to move outwardly sufficiently to bring the radial holes 33 in the slide member into alignment with the holes 29 in the restrictor member to open the bypass 17. With the diferential pressure relieved, the springs 45 acting on the outer ends of the shafts will force the shafts axially inward to bring notches or cut-outs 53 in the shafts into radial alignment with the balls or rollers, thus permitting the balls to be forced radially outwardly by the action of the spring 36 on the slide member so that the slide member can now move further forward to reopen the bypass.

Non-circular sides or flats 55 may be provided on the shaft flange portions 46 in close proximity to the inner wall of the orifice support tube 10 or spring retainers 47 to prevent the shafts 42 from rotating to maintain the proper orientation of the notches 53 in the shafts with respect to the balls or rollers. Also, shallower grooves 56 are desirably provided at the inner ends of the grooves 52 in axial alignment therewith for engagement by the balls or rollers 50 when the balls are forced out of the deeper grooves 52 to maintain the proper orientation of the balls with respect to the grooves and of the radial holes 33 in the slide member with respect to the radial holes 29 in the restrictor member.

A split ring 60 may also be disposed within an external groove 61 around the restrictor member 20 intermediate the ends thereof to act as a rebound or recoil valve to dampen the outstroke of a weighted gear for normal bounce during taxiing. During such outstroke movement, the return flow through the bypass 17 causes a suction that forces the split ring up against an external annular shoulder 62 on the restrictor member. Since the split ring also slidably engages the inner wall of the orifice support tube 10, the return flow through the bypass is restricted to a narrow slot 63 between the ends of the ring (see FIG. 6), thus requiring the air pressure in the upper chamber 19 to drive hydraulic fluid through the slot (and also through the primary orifice 12) in order to lift the supported weight of the aircraft as part of the return stroke. However, during instroke movements of the gear while taxiing, the hydraulic fluid flowing through the bypass passage 17 will cause the split ring 60 to move out of engagement with the shoulder 62 and up against two or more stop pins 64 as shown in FIG. 7 whereby the bypass fluid is free to flow through the center opening 65 in the split ring which has a larger diameter than the O.D. of the groove 61 thus effectively removing the split ring during the instroke so that there is no damping caused by the split ring during such instroke.

From the foregoing, it will now be seen that the taxi instroke bypass valve of the present invention provides a very simple and effective means for substantially reducing or eliminating high damping loads as the landing gear negotiates bumps during taxiing. Such taxi instroke bypass valve may also effectively be incorporated within the restrictor assembly to simplify the construction of the bypass valve and facilitate packaging of the restrictor assembly and bypass valve into a smaller space within the envelope of a standard landing gear. Also, a simplified mechanism may be provided for restricting the return flow through the bypass passage in the restrictor assembly during the outstroke movement of the gear but not during the instroke movement.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

The embodiments of the invention in which an exclusive property or privilege is claimed are defined as follows:

1. A landing gear mechanism for an aircraft comprising a main cylinder, a main strut piston axially movable within said main cylinder, a restrictor member contained within said cylinder and defining with said cylinder and piston upper and lower chambers, said restrictor member having a primary orifice therethrough for controlling the rate of flow of hydraulic fluid from said lower chamber to said upper chamber during landing, and bypass means providing for increased flow of hydraulic fluid from said lower chamber to said upper chamber whenever said landing gear mechanism engages a bump during taxiing to reduce the damping loads that would otherwise occur if all of such hydraulic fluid were required to flow through said primary orifice, said bypass means comprising a bypass passage around said primary orifice, a slide member mounted for axial movement relative to said restrictor member between open and closed positions for respectively opening and closing said bypass passage, and means for keeping said slide member in the closed position until after landing has taken place and a pressure equilibrium has been established in said chambers, said last-mentioned means being responsive to such pressure equilibrium being established in said chambers after landing has taken place to move said slide member to the open position.

2. The landing gear mechanism of claim 1 wherein said last-mentioned means comprises first means for retaining said slide member in the closed position prior to landing which operates independently of the fluid pressure in said chambers, second means which is responsive to a high pressure differential in said lower chamber to keep said slide member in the closed position during landing, and third means for moving said slide member to the open position after landing has taken place and a pressure equilibrium has been established in said chambers.

3. The landing gear mechanism of claim 2 wherein said first means comprises a pusher member which is movable into engagement with said slide member as said gear reaches its fully extended position to move said slide member to said closed position and maintain said slide member in such closed position as long as said gear is fully extended.

4. The landing gear mechanism of claim 3 wherein said pusher member is connected to said piston for movement therewith.

5. The landing gear mechanism of claim 2 wherein said restrictor member has an opening therethrough, and there is a metering pin attached to said piston, said metering pin extending through said opening in said restrictor member and defining said primary orifice therebetween, said first means being carried by said metering pin for movement therewith into engagement with said slide member as said gear reaches its fully extended position as aforesaid.

6. The landing gear mechanism of claim 5 wherein said first means comprises a radial shoulder on said metering pin which is engageable with said slide member.

7. The landing gear mechanism of claim 6 wherein said radial shoulder has slots therein to permit unobstructed passage of fluid past said shoulder when in engagement with said slide member.

8. The landing gear mechanism of claim 2 wherein said second means comprises radially movable locking members in said restrictor member, recesses in said slide member for receipt of said locking members, and retaining means responsive to a high pressure differential which is generated in said lower chamber during landing for retaining said locking members in said recesses to prevent axial movement of said slide member to the open position during landing.

9. The landing gear mechanism of claim 8 wherein said retaining means is also responsive to a pressure equilibrium in said chambers which occurs after landing has taken place to permit movement of said locking members out of said recesses so as not to interfere with the movement of said slide member to the open position.

10. The landing gear mechanism of claim 9 wherein said recesses comprise longitudinal grooves in the exterior of said slide member which permit limited axial movement of said slide member relative to said restrictor member while in the fully closed position.

11. The landing gear mechanism of claim 10 further comprising additional grooves in said slide member which provide an axial extension of said first mentioned grooves but which are shallower than said first mentioned grooves and are engageable by said locking members when said slide member is in the open position to maintain said slide member axially oriented with respect to said restrictor member for proper opening and closing of said bypass passage.

12. The landing gear mechanism of claim 11 wherein said bypass passage includes a plurality of radial holes in said restrictor member which are respectively blocked and unblocked when said slide member is in the open and closed positions.

13. The landing gear mechanism of claim 12 wherein said slide member includes a plurality of radial openings which are respectively brought into and out of alignment with said radial holes in said restrictor member whenever said slide member is axially moved between the open and closed positions.

14. The landing gear mechanism of claim 8 wherein said locking members comprise ball-like members contained in radial openings in said restrictor member in radial alignment with said recesses in said slide member.

15. The landing gear mechanism of claim 14 wherein said retaining means comprises a plurality of axially movable shafts in said restrictor member, said shafts being axially movable between a first position in which said shafts prevent radial outward movement of said locking members out of said recesses in response to a high differential pressure in said lower chamber and a second position permitting such radial outward movement of said locking members from said recesses when there is a pressure equilibrium in said chambers.

16. The landing gear mechanism of claim 15 wherein said shafts have notches therein which are brought into alignment with said locking members when said shafts are in said second position.

17. The landing gear mechanism of claim 16 further comprising spring means for moving said shafts to said second position when there is a pressure equilibrium in said chambers.

18. The landing gear mechanism of claim 16 further comprising means for maintaining the angular orientation of said notches in said shafts with respect to said locking members during axial movement of said shafts between said first and second positions.

19. The landing gear mechanism of claim 16 further comprising flange means on said shafts for preventing rotation of said shafts relative to said restrictor member.

20. The landing gear mechanism of claim 2 wherein said third means comprises spring means for moving said slide member to said open position upon release of said first and second means.

21. The landing gear mechanism of claim 1 wherein said bypass passage includes a plurality of radial holes in said restrictor member which are respectively blocked and unblocked by said slide member when said slide member is axially shifted between the open and closed positions.

22. The landing gear mechanism of claim 21 wherein said slide member includes a plurality of radial openings which are respectively brought into and out of alignment with said radial holes in said restrictor member when said slide member is axially shifted between the open and closed positions.

23. The landing gear mechanism of claim 21 wherein said bypass passage further comprises a plurality of bypass orifices at the outboard end of said restrictor member.

24. The landing gear mechanism of claim 23 wherein said restrictor member is supported within said cylinder by an orifice support tube attached to the outboard end of said cylinder, said restrictor member having opposite ends in sealed engagement with said orifice support tube, and said bypass passage further includes a clearance space between said restrictor member and orifice support tube intermediate the ends of said restrictor member.

25. The landing gear mechanism of claim 24 further comprising restrictor means for restricting the return flow through said bypass passage during the outstroke movement of said gear.

26. The landing gear mechanism of claim 25 wherein said restrictor means comprises a split ring disposed in an annular groove surrounding said restrictor member, said groove having an annular shoulder at the outboard end thereof which is engaged by said split ring during such outstroke movement of said gear to limit the flow of hydraulic fluid through said bypass passage.

27. The landing gear mechanism of claim 26 wherein the outer diameter of said split ring is in close sliding engagement with the inner wall of said orifice support tube to restrict the bypass flow through a narrow slot in said split ring during such outstroke movement of said gear.

28. The landing gear mechanism of claim 26 further comprising a stop pin for permitting limited movement of said split ring away from said shoulder during the instroke movement of said gear while taxiing to permit unobstructed flow through said bypass passage through a clearance space between the inner diameter of said split ring and the outer diameter of said groove.

* * * * *